United States Patent [19]
Jensen

[11] Patent Number: 5,131,820

[45] Date of Patent: Jul. 21, 1992

[54] LOW PRESSURE, LOW HEAD BUOYANT PISTON PUMP FOR WATER PURIFICATION

[76] Inventor: Kyle R. Jensen, 1168 Woodland Terrace Trail, Altamonte Springs, Fla. 32714

[21] Appl. No.: 697,942

[22] Filed: May 9, 1991

[51] Int. Cl.$^5$ .................. F04B 21/04; F04B 17/00
[52] U.S. Cl. .................. 417/415; 417/545; 417/555.1
[58] Field of Search .............. 417/545, 555.1, 415, 417/375; 366/267, 269

[56] References Cited

U.S. PATENT DOCUMENTS

| | | | |
|---|---|---|---|
| 28,405 | 5/1860 | Dale | 417/545 |
| 449,548 | 3/1891 | Martin | 474/125 |
| 458,913 | 9/1891 | Morgan et al. | 104/197 |
| 640,871 | 1/1900 | Bunimowitsch et al. | 119/49 |
| 979,567 | 12/1910 | Rosenthal | 474/167 |
| 1,531,233 | 3/1925 | Davis | 434/171 |
| 1,532,775 | 4/1925 | Page | 37/117 |
| 3,547,083 | 12/1970 | Peterson . | |
| 4,333,263 | 6/1982 | Adey | 56/9 |
| 4,534,706 | 8/1985 | Palm et al. | 417/17 |

FOREIGN PATENT DOCUMENTS 1028874 7/1983 U.S.S.R. .................. 417/545
666429 2/1952 United Kingdom .

Primary Examiner—Richard A. Bertsch
Assistant Examiner—Peter Kortnyk
Attorney, Agent, or Firm—Julian C. Renfro

[57] ABSTRACT

A continuously cycling, low pressure, low head pump utilized for supplying periodic surges of water across an algal turf closely associated with the surface of a body of water, this pump comprising a generally vertically disposed cylinder whose lower end resides below the surface of the body of water and whose upper end is disposed above the surface of the body of water and slightly above the algal turf. An opening is provided adjacent the top of the cylinder, through which water, on occasion, can flow onto the algal turf, and a lightweight, buoyant piston is operatively disposed in the cylinder. A power applying device is utilized for forcing the piston downwardly, such that it moves from a partially submerged, floating position adjacent the upper end of the cylinder, to the lower end of the cylinder. When the piston is suddenly released, it rapidly rises to the upper end of the cylinder, and in doing so, pushes a quantity of water out of the opening in the upper part of the cylinder, and onto the algal turf.

18 Claims, 3 Drawing Sheets

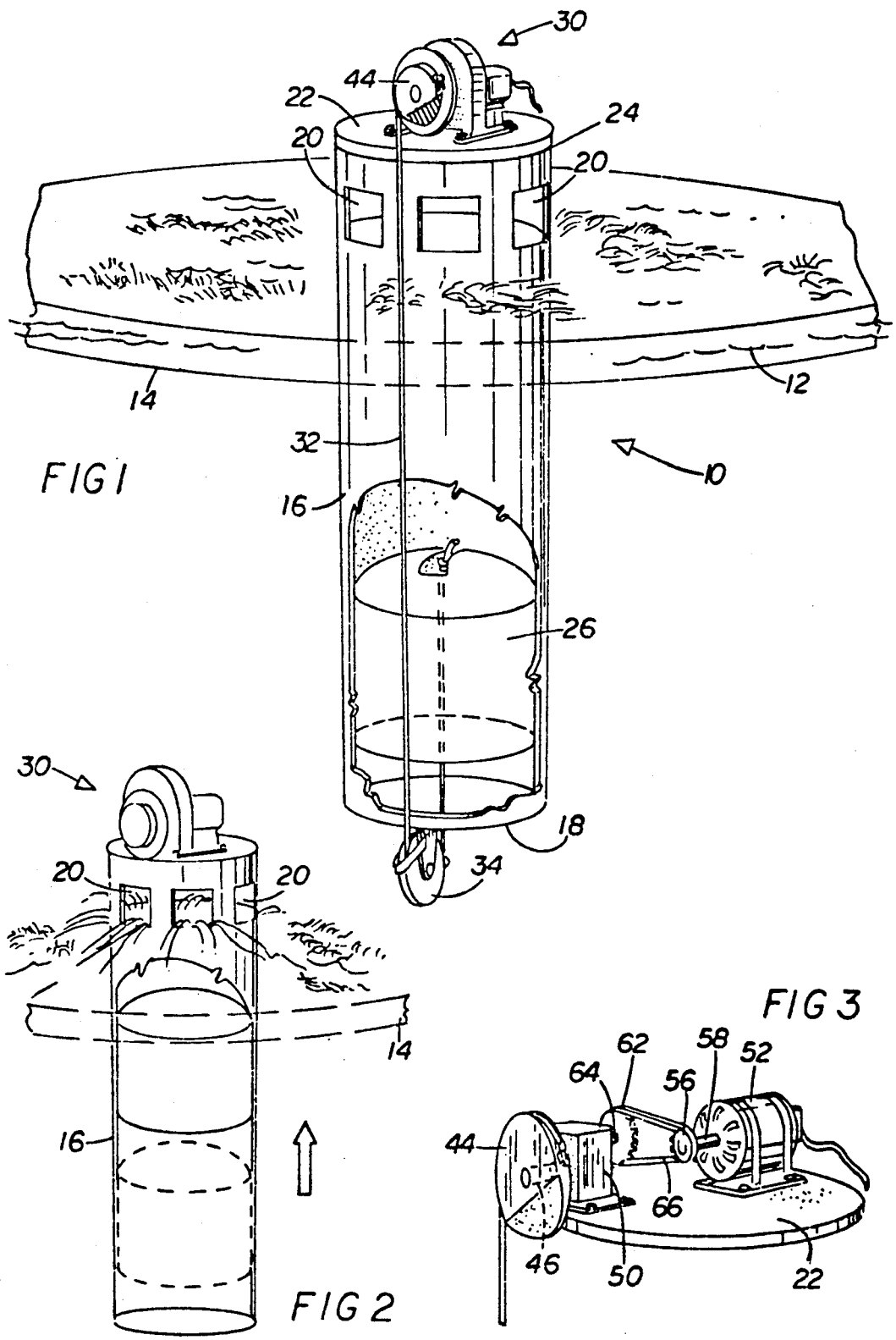

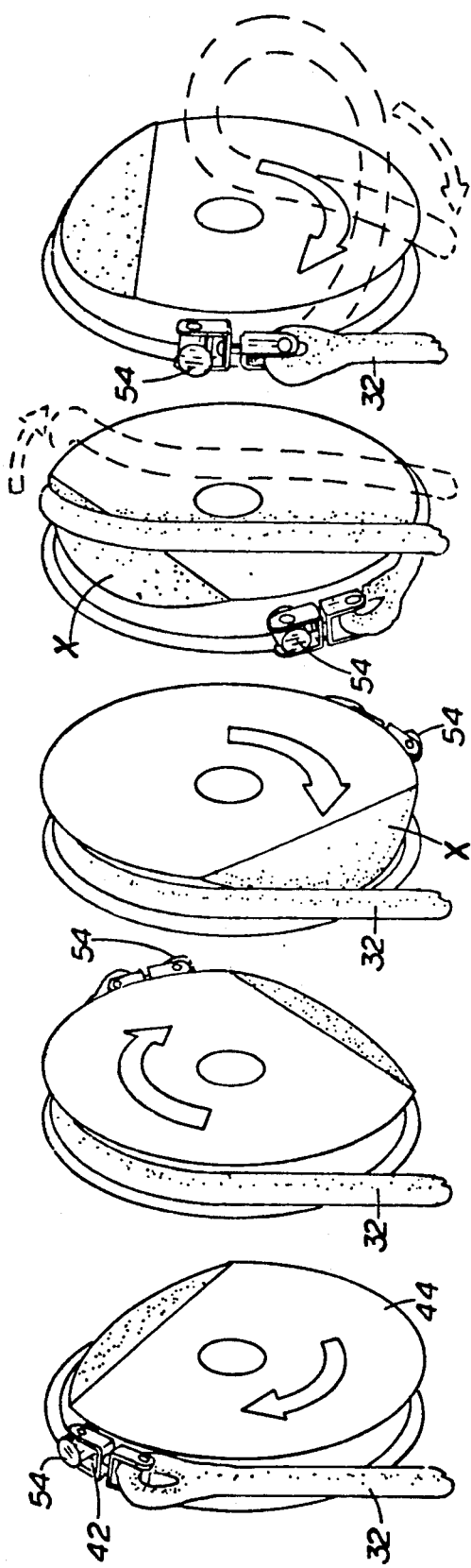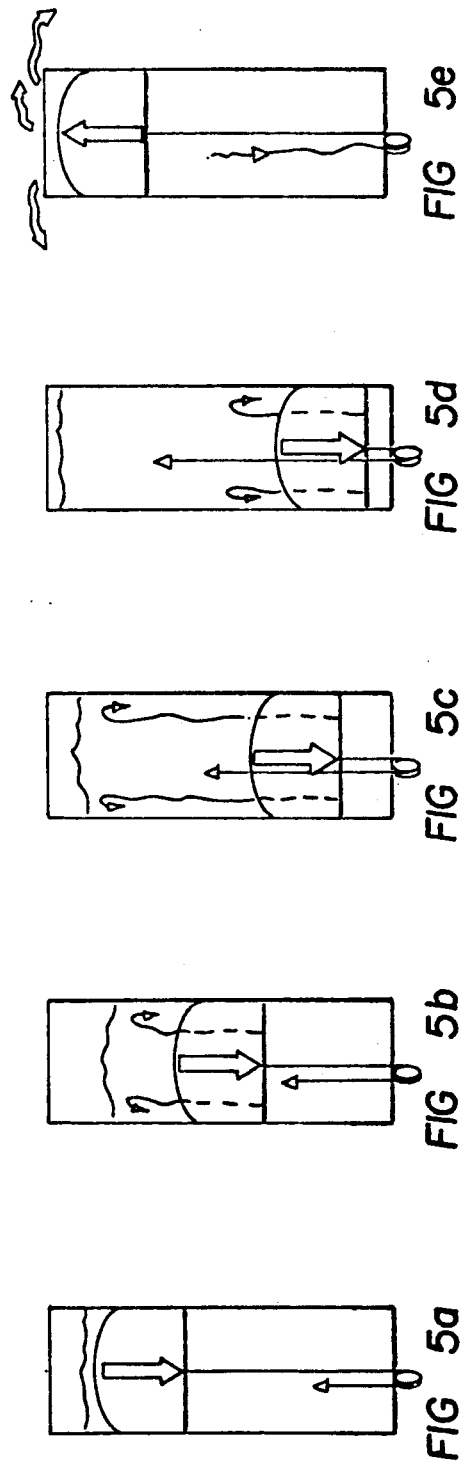

LOW PRESSURE, LOW HEAD BUOYANT PISTON PUMP FOR WATER PURIFICATION

BACKGROUND OF THE INVENTION

This invention relates to a low pressure, low head pump utilized for providing a surge of water to a bed of algal turf. Such turf may be grown under natural or artificial light in a regime utilizing repetitive surging water motion. Such turfs are known to be efficient scrubbers of carbon dioxide, ammonia, nitrite, nitrate, phosphate, heavy metals and a variety of other pollutants found in natural or waste water as well as in sewage. As a result of the scrubbing action, such turfs may produce biomass and oxygen to a certain degree. They also raise the pH of the water, and under low nutrient conditions can be used to fix nitrogen.

This invention has particular utilization with the techniques disclosed in the Adey U.S. Pat. No. 4,333,263 entitled "Algal Turf Scrubber," which issued Jun. 8, 1982.

Algal turf scrubbing can potentially be used for a variety of applications. For example, the scrubbers can be used to replace the biological or bacteriological filters in aquaria. Scrubbers can also be used to remove nutrients and other contaminants from polluted waters. Finally, by harvesting the algal mass, the technique can be used to produce biomass as an energy source, as a fertilizer or as a human or an animal food supplement.

Studies in algal turf production are well known and reported in the literature. For more than 20 years, tropical reefs have been acknowledged to be among the most productive of natural systems. For example, in Lewis, "Processes of Organic Production on Coral Reefs," pp. 305-347, 52 Biol. Rev. (1977), production values as found, for example, on Page 312 therein, indicate that coral reefs are among the highest producers in primary production values for pelagic, benthic and terrestrial ecosystems.

Notwithstanding the values demonstrated in some earlier literature, recent efforts have demonstrated that those estimates of reef primary productivity were conservative. The mean reported value, 10.3 $gC/m^2/day$ should be contrasted to values ranging from 19.2 to 32.7 $gC/m^2/day$ in a 1980 study referring to St. Croix reefs. Such recent studies have demonstrated that algal turfs in conjunction with wave surge have been identified as the primary source of most reef productivity.

Within this technology it has been known that the removal or severe reduction of wave surge motion greatly reduces primary productivity, a typical daily cycle of oxygen concentration in a reef microcosm. Reef production is accurately measured only near saturation since atmospheric exchange is a factor at higher or lower oxygen concentrations. When a wave generator used in such reef microcosm devices is stopped, given the same current, light, and nutrient levels, net productivity is nearly zero. The lack of an oxygen spike when the wave generator is restarted indicates that greatly reduced production is a real factor as opposed to an apparent condition because storage has not occurred.

Additionally, within the reported literature on research in this technology, there are a number of reports dealing with algae techniques for waste recycling, oceanic farming, or the like. Contemporary research can be grouped in two distinct categories: those utilizing macro algae and those using planktonic algae. In the first group, macro algae reports dealing with waste recycling or the like can be found in Ryther, et al, "Physical Models of Integrated Waste-Recycling Marine Polyculture Systems," Aquaculture, 5, 163-177 (1975); California Institute of Technology, Graduate School Project "Evaluating Oceanic Farming of Seaweeds As Sources of Organics and Energy," U.S. Department of Energy, Division of Solar Technology, Contract E (04-3)-1275; and Washington State Department of Natural Resources, Project "Aquaculture of Seaweeds on Artificial Substrates," U.S. Department of Commerce, Contract R/A-12. In the case of planktonic algae, Goldman et al, "Relative Growth of Different Species of Marine Algae in Wastewater-Seawater Mixtures," Marine Biology, 28, 17-25 (1974); Karolinska Institutet, "Investigation of an Integrated Aquatic System for Storing Solar Energy in Organic Material," Namnden for Energiproduktionforskning, No. 53 3065 062; and State of Hawaii Natural Energy Institute, "Energy from Algae of Bioconversion and Solid Waste," Hawaii State Government, demonstrate the status of contemporary research using that type of algae.

In either case, research to date has not utilized wave surge motion as discussed herein to enhance the exchange of metabolites between algal cells in the water medium. Also, these known research techniques have not recognized the cruciality of macro algae size, vis-a-vis the shading of one cell by another. Accordingly, such techniques are not suitable for optimum biomass production and the propensity of removing nutrients and other contaminants from polluted waters is severely limited.

Utilized in conjunction with this invention are micro algae of the major groups of benthic algae. In such algae, the use of attached algal turfs, wherein the simple algae all or most cells are photosynthetic, demands critical attention to wave surge motion. By optimizing such surge motion together with harvesting techniques, metabolite cellular-ambient water exchange is optimized and continuous shading of one cell by an adjacent cell is prevented.

Algal turf growth can be achieved in an aqueous environment by providing a suitable vacant area in which spores may settle. The first colonizations are usually microscopic diatoms which are then rapidly dominated by the turf species. In accordance with the present invention, the harvesting of such turfs must occur before they are overgrown in turn by the larger macroalgae. This keeps production rates at a high level and minimizes predation by grazing microorganisms. The rate of harvesting is dependent on light levels, temperature and surge action. Immediate regrowth of the algal turf will occur if the vacant surface or substrate is sufficiently coarse to allow a filamentous base of the algae to remain following harvesting. Typically, such a substrate can be a plastic screen having screen grid dimensions in the range of approximately 0.5 to 5 mm.

Using screens, harvesting can be accomplished by simply scraping the surface, using a vacuum, or in the context of artificial growing techniques, the screen can be set up for removal for harvesting.

It was to improve upon the means for more efficiently supplying optimal strength periodic surges of water across a algal turf that the present invention was evolved.

SUMMARY OF THE INVENTION

In accordance with this invention, a continuously cycling, low pressure, low head pump is utilized for supplying periodic surges of water across a section of algal turf closely associated with the surface of body of water. One preferred embodiment of my novel pump comprises an elongate, generally vertically disposed cylinder whose lower end resides below the surface of the body of water and whose upper end is disposed above the surface of the water and slightly above the algal turf.

A lightweight, buoyant piston is operatively disposed in the cylinder, with a rope or line attached to a lower portion of the piston and thereafter passing around a first pulley, closely adjacent the lower end of the cylinder. The rope or line thereafter passes upwardly to a location adjacent the upper end of the cylinder, at which location the rope is attached adjacent the peripheral portion of a second pulley. Power applying means are operatively associated with the second pulley and arranged to cause the second pulley to rotate in a direction causing the rope to commence wrapping around the periphery of this pulley. Such wrapping of the rope or line around the second pulley causes the piston to be moved from a partially submerged, floating position adjacent the upper end of the cylinder, to a submerged position located adjacent the lower end of the cylinder. The piston, when in such lowered position, has thereabove a quantity of water residing in the cylinder.

A portion of the second pulley is removed in such a way that the rope will intentionally slip off the circumference of the second pulley in an outward direction when the piston has been drawn to its lowest position. The rope slipping off of the circumference of the second pulley causes the piston to be suddenly released, so that the piston can rapidly rise along the interior of the cylinder to the upper end thereof, and in doing so, pushing the quantity of water out of an opening in the upper part of the cylinder and onto the algal turf. A swivel or other suitable means is utilized in the rope or line to eliminate any undesirable amount of twist in the line.

Other embodiments of this invention will be considered in detail.

Accordingly, it is an object of this invention to define a technique of algal turf scrubbing wherein wave surge motion provided by a novel, highly efficient, low head, low pressure pump is used to optimize the exchange of Metabolites between micro algal cells and the water medium.

A further object of this invention is to utilize the technique of micro algal turf scrubbing for the production of biomass, while making use of a continuously cycling, low pressure, low head pump that supplies periodic surges of water across an algal turf.

Still another object of this invention is to provide a pump of simple and inexpensive construction having minimal power requirements and making effective use of a buoyant piston for periodically supplying liquid to a point of use, this liquid typically being a surging quantity of water delivered to algal turf.

These and other objects of this invention will become apparent from the description of the preferred embodiment when taken with the appended drawings.

BRIEF DESCRIPTION OF DRAWINGS

FIG. 1 is a perspective view of my novel low pressure, low head pump, revealing the lightweight, buoyant piston having been pulled by the system of pulleys and rope to a location adjacent the lower end of the elongate cylinder;

FIG. 2 is a perspective view generally similar to FIG. 1, but revealing the buoyant piston having been suddenly released from the lower end of the cylinder as a result of the interaction of the rope with the novel chamfered pulley I utilize, with the sudden rise of the piston causing a surging quantity of water from the cylinder to cascade across the algal turf;

FIG. 3 is a fragmentary view of one embodiment of a means for causing the buoyant piston to be moved to the lower end of the cylinder;

FIGS. 4a through 4e are a series of related views showing various rotative positions of the chamfered pulley, and revealing how the rope associated with the piston interacts therewith;

FIGS. 5a through 5e are a series of views of the buoyant piston, with the position of the piston in each of these views being able to be correlated with the rotative position of the pulley shown thereabove;

DETAILED DESCRIPTION

Figure 6:
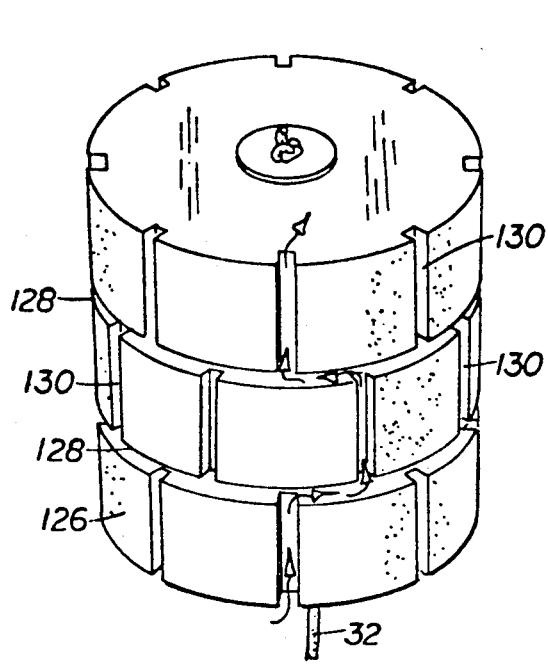
FIG. 6 is an embodiment of a lightweight piston usable in accordance with my invention, with passages being provided on the exterior of the piston for permitting the flow of water past the piston during the downward movement of the piston.

With initial reference to FIG. 1, it will there be seen that I have depicted a preferred embodiment of my continuously cycling, low pressure, low head pump 10 for supplying periodic surges of water across an algal turf closely associated with a body of water 12.

The algal turf may be in the form of a floating algal bed 14 that may for example circular and for example ten feet in diameter. Disposed in the middle of the floating algal bed is a vertically disposed cylinder 16 constituting an essential part of the low pressure pump 10. The cylinder 16 is open at its bottom end 18, which is located below the surface of the body of water 12, and a plurality of openings 20 are provided adjacent the upper end 24 of the cylinder 16. A platform 22 is provided on the top of the cylinder for supporting certain components, described hereinafter, that are associated with desired movements of the lightweight, buoyant piston 26 that is operatively disposed inside the cylinder 16.

It is to be noted that it is the natural tendency of the lightweight piston 26 to float at or near the upper interior end 24 of the cylinder. Power applying means 30, disposed on the platform 22 and discussed hereinafter, enable the piston to be periodically forced to the bottom end 18 of the cylinder 16, to the position shown in FIG. 1, and then suddenly released to bring about a flow of water from the upper end of the cylinder, in the manner shown in FIG. 2.

It is significant that the piston 26 is cylindrically configured, and has sufficient length along its longitudinal axis as not to become lodged sideways in the interior of the cylinder 16. On the other hand, however, the piston does not fit tightly inside the cylinder, and it is equipped with a sufficient number of passages interconnecting the upper and lower ends of the piston as will permit water to flow past the piston as it is periodically drawn by the power-applying means to the bottom end of the cylinder. The utilization of such passages is discussed in conjunction with FIGS. 6 and 7.

Because of the provision of appropriate passages, the piston can be moved relatively easily, in a virtually friction-free manner, down along the central longitudinal axis of the cylinder by the power applying means, and no great amount of force is required. By the time the piston reaches the bottom of the cylinder, a nearly full column of water exists above the piston.

I may provide a fitting at the bottom of the piston 26 to serve as the attachment point for one end of a rope or line 32, or I may cause the rope to pass entirely through the piston and be attached at the top thereof, as depicted in FIG. 1. After leaving the bottom of the piston, the rope thereafter passes over the circumference of an adjacent pulley 34, hereinafter called the first pulley. The pulley 34 is mounted below the bottom end 18 of the cylinder in a manner permitting its ready rotation. The pulley 34 is symmetrically configured, with a suitable flange on each perimeter, so as to prevent the rope 32 from sliding off or becoming dislodged from the pulley during the operation of the power applying means. As an additional measure, I may utilize the pulley 34 inside a block that serves as an additional means for preventing the rope or line from becoming dislodged from the circumference of the pulley during the application of power thereto.

After passing over the first pulley 34, the rope 32 then continues upwardly through a suitable aperture in the algal bed 14 and attaches to the periphery of the second or chamfered pulley 44, which is rotatably mounted on the power applying means 30 residing on the platform 22, atop the cylinder 16.

A significant aspect of this invention is involved in the design and utilization of the second pulley 44, which I prefer to call a chamfered pulley because of its novel construction, and which will be discussed shortly. As viewed in the low cost version of the power applying means depicted in FIG. 3, pulley 44 is fixedly attached to a rotatable shaft 46 that is operatively disposed on a housing 50 in which certain reduction gearing is utilized. For this reason I may from time to time refer to the housing as gearbox 50. The housing or gearbox 50 is secured to the platform 22, and preferably supports the shaft 46 upon which pulley 44 is disposed in a generally horizontal attitude.

Adjacent the housing or gearbox 50 is mounted an electric motor 52, and because of the very modest power requirements of this embodiment of my low pressure, low head pump, the motor 52 may be a fractional horsepower motor.

In the low cost version of an arrangement for moving the piston 26 into the lowered or "cocked" position depicted in FIG. 3, a toothed sprocket 56 is mounted on the output shaft 58 of the motor 52, and a toothed sprocket 62 is mounted on the input shaft 64 of the gearbox 50, over which sprockets a suitable endless drive chain 66 is operatively disposed. As a result of this arrangement, as the electric motor 52 rotates, it continuously drives the chamfered pulley 44 in a consistent rotative direction. I prefer to collectively call components of this type the power applying means.

With reference now to related FIGS. 4a through 4e, it will be noted from FIG. 4a that the upper end of the rope or line 32 is affixed at location 54 adjacent the periphery of the chamfered pulley 44, with suitable flanges being utilized on this portion of the pulley 44. The flanges utilized on the pulley 44 function in an expected manner to assure that the rope or cord 32 will wrap around the circumference or periphery of this pulley as the pulley 44 is driven in rotation by the motor 52.

It is important to note in FIG. 4a that I use a swivel 42 in the line or rope, to prevent the development of twist in the rope or line. I refer to this as a twist prevention means, and I am not to be limited to the use of a swivel, and by way of example, I could instead use a form of beaded chain to prevent the development of twist in the cord or rope. Other suitable forms of twist preventing means are possible.

It will be observed that FIG. 5a is located directly below FIG. 4a, and it will be further noted that the piston being at the top of the cylinder, it is in a position that corresponds to the position of the chamfered pulley 44 as it commences a new cycle.

The continued rotation of the pulley 44 in the direction indicated by the arrow causes the attachment point 54 to move to the position shown in FIG. 4b, which causes the rope or line 32, acting across the lower or first pulley 34, to pull the buoyant piston 26 downwardly, against the upward force of the water, to the position indicated in FIG. 5b. Small arrows on the piston depict the passage of water through the piston.

Still further rotation of the pulley 44 causes the attachment point 54 to move to the position shown in FIG. 4c, with the presence of both flanges of the second pulley 44 causing the rope 32 to continue to wrap around the circumference or periphery of the pulley 44. At this point, the piston is nearing the bottom of the cylinder, as illustrated in FIG. 5c.

In accordance with this invention, I chamfer or remove a portion of the outer flange of the pulley 44 through the approximate extent of 30 degrees to 90 degrees of arc, at a location I call "Sector X." This sector is quite noticeable in FIG. 4c. By outer flange I intend to refer to the flange on the side of the pulley 44 away from the rotatable shaft 46 upon which it is mounted.

Significantly, by the time the pulley 44 has rotated to the position shown in FIG. 4d, the rope or line 32 is starting to slip off of or be derailed from the periphery of the pulley, and to reside on Sector X. In FIG. 4e, the rope or line 32 has abruptly fallen away from the periphery or circumference of the pulley 44, and has assumed a vertical position in which the only contact of the rope with the second pulley is the attachment point 54. The result of this displacement or slippage of the rope off the circumference of the pulley 44 is the sudden release of the buoyant piston 26 from its location adjacent the bottom end 18 of the cylinder 16. The piston 26 immediately rises in the cylinder 16, pushing all of the water above it out through the openings 20 located adjacent the upper end 24 of the cylinder, and out onto the algal turf, as shown in FIG. 2. As is obvious, the desired stroke of the piston must be correlated with the circumference of the chamfered pulley 44.

The foregoing represents the desired effect of my invention, for the surge of water from the openings 20 at the upper part of cylinder 16 flows across the upper surface of the floating algal bed 14 in a very desirable manner. This is a far superior to an arrangement utilizing falling water, for the turbulence therefrom can cause dislodgment of algal filaments. My arrangement is more efficient inasmuch a total head is reduced to the minimum required to produce a surge of water.

It is important to note that during the operation of my pump, the second pulley 44 rotates continuously, typically at a rate of one to seven revolutions per minute, and no human intervention is necessary. This is because the arrangement is such that, in a manner of speaking, a "self-loading" of the rope onto the full flange portion of the second pulley 44 is automatically brought about. The power applying means principally involving the pulley 44 and its drive motor 52 can operate continuously for weeks, months or years at a time, with it being unnecessary to stop the motor, even when the algae are to be harvested from the algal bed.

In FIG. 6 I illustrate an embodiment 126 of a buoyant piston, around the periphery of which I have utilized a number of horizontal passages 128, to which are connected a number of vertical passages 130. These passages represent what may be regarded as a tortuous passage arrangement, which is an arrangement configured to prevent the sudden rush of water therethrough. This characteristic is desirable inasmuch as during the time that the piston is being drawn downwardly in its cylinder, water is intended to flow to the location above the piston, so that there will be a sizable "head" of water residing in the cylinder above the piston. In that way I bring about a highly desirable surge of water through the openings 20 at such time as the piston is suddenly released.

The passage 128 and 130 can be sized in accordance with the need, so that the interior of the cylinder above the piston will be substantially filled with water by the time the piston is to be released.

Figure 7:
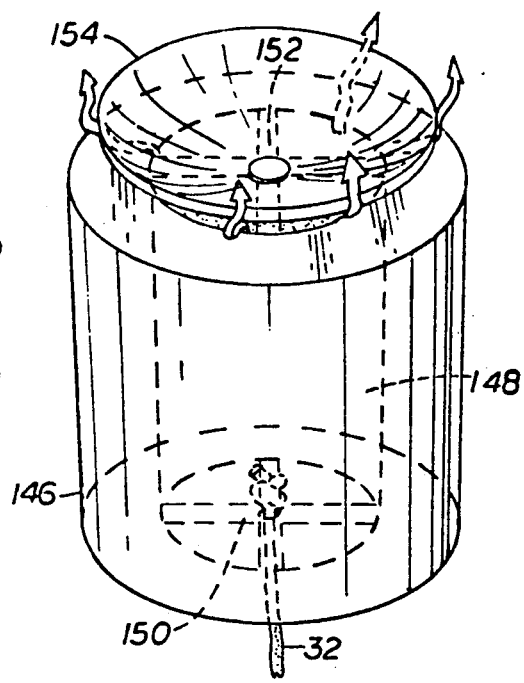
FIG. 7 is another embodiment of a lightweight piston in accordance with this invention, with a form of flapper valve used on the upper surface of the piston that opens during the downward movement of the piston, but that closes at such time as the piston is released.

In FIG. 7 I reveal a piston embodiment 146, which has relatively smooth outer sidewalls, but which has a substantially hollow interior portion 148. I typically utilize an open support known as a "spider" arrangement 150 at the bottom of the piston, to which the rope or line is to be attached, and I also use a "spider" arrangement 152 at the top of the piston.

The spider arrangement 152 serves to support what may be regarded as a circular flapper valve 154, that is shown in its deflected position in FIG. 7, with water flow around all sides of the flapper valve being denoted by the several small arrows. It is to be understood that the flapper valve 154 is a normally-closed valve made of tough yet flexible material, such as reinforced rubber or silicone. As a consequence of this construction, during the time the piston 146 is being pulled downwardly by the rope or line, the flapper valve can readily permit water to flow through the piston and into the interior of the cylinder above the piston.

It is also to be understood that as soon as the piston 146 is released, the flapper valve 154 quickly closes, so that water can no longer pass through the piston. As a consequence, the water located in the cylinder above the piston 146 is delivered as a surge through the openings in the top of the cylinder when the piston is released.

Figure 8:
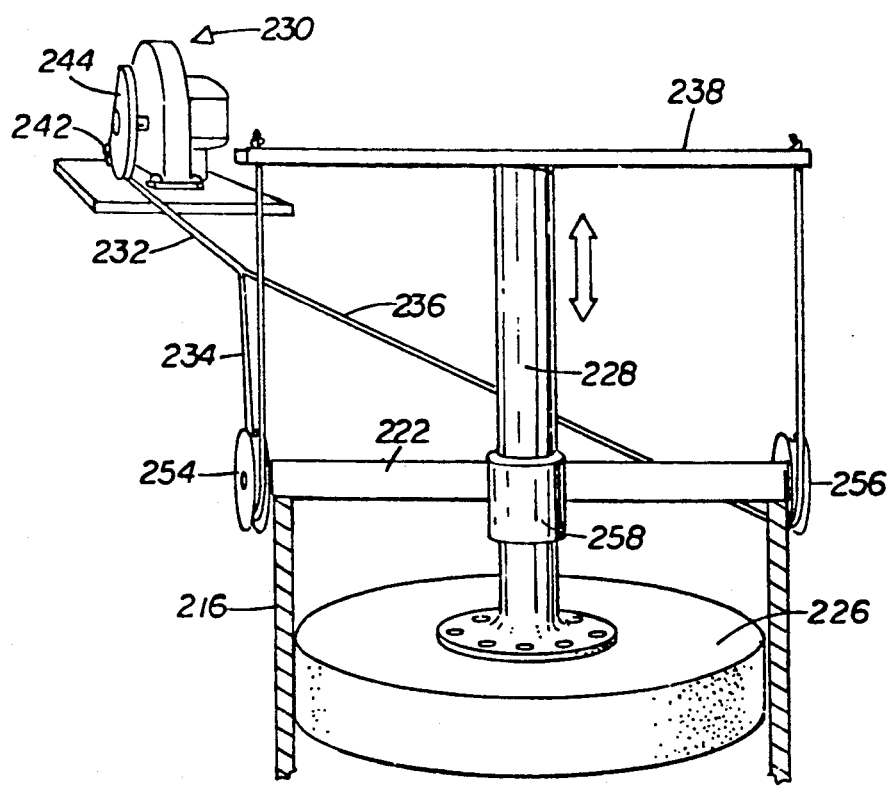
FIG. 8 is a perspective view of a modified arrangement for causing the buoyant piston to be moved into a lowered position in its cylinder.

Turning to FIG. 8, I have shown an embodiment of my invention in which it is unnecessary to have an movable components below the water line, other than the buoyant piston. This embodiment involves a cylinder 216 in which a piston 226 is readily movable. A vertically disposed, rigid piston rod 228 is mounted on the upper edge of the piston 226, with a yoke 238 being supported from the upper end of the piston rod 228.

A power applying means 230 is utilized at a location spaced somewhat away from the cylinder 216, which power applying means is arranged to drive a chamfered pulley 244 in rotation, at a speed of from one to seven revolutions per minute. A rope or line 232 is arranged to interact with the chamfered pulley 244 in the manner described with regard to the previous embodiments, with appropriate twist preventing means 242 being utilized to prevent undesired twist in the rope or line 232.

It will be noted that the rope or line 232 connects to a pair of lines 234 and 236, which lines respectively pass over pulleys 254 and 256 rotatably supported adjacent a modified form of platform 222 located atop the cylinder 216. I may refer to these as first pulley or pulleys. The ends of the lines 234 and 236 are attached to the respective ends of the yoke 238. A sleeve 258 is supported from the center of the platform 222, in which sleeve, the piston rod 228 is slidably received.

When the motor associated with the power applying means 230 is energized, the chamfered pulley 244 is driven in rotation, which causes the rope or line 232 to be pulled toward the power applying means. This movement of the rope or line 232 causes the separate lines to 234 and 236 to move to a like extent, with this movement causing the yoke 238 located atop the piston rod 228 to be drawn downwardly. By having an attachment to the top of the piston rod 228, the downward movement of the yoke 238 causes the piston 226 to move downwardly in a desirable manner in the cylinder 216. Any tendency of the piston 226 to rotate or become misaligned in the cylinder 216 is of course prevented by the piston rod 228, whose movements are effectively controlled by the sleeve 258.

This arrangement might be more costly than an arrangement of the type discussed in conjunction with FIG. 1, but is particularly advantageous in that all facets of its operation can be observed from a distance away from the installation. Also, the piston 226 can be a large diameter, shallow depth, relatively short stroke piston, which is advantageous in instances in which the water surrounding the algal bed is relatively shallow. As is obvious, a large embodiment of my novel pump, too large to use as a floating device, can be mounted to the subsurface grade.

I am obviously not to be limited to any particular size piston or to any size motor, but the following examples represent different ways in which my invention can be implemented.

|  | Example 1 | Example 2 |
|---|---|---|
| Piston diameter | .5' | 1' |
| Stroke of piston | .5' | 2' |
| Size of motor | .0001 hp | .014 hp |
| Quantity of Water | 3 gpm | 40 gpm |
| Power supply | Storage battery or 110 volt AC | 110 volt AC |
| Cycles per minute | 4 | 4 |

|  | Example 3 | Example 4 |
|---|---|---|
| Piston diameter | 3' | 12' |
| Stroke of piston | 3' | 4' |
| Size of motor | .237 hp | 12 hp |
| Quantity of Water | 941.5 gpm | 10,567 gpm |
| Power supply | 110 volt AC | 110 volt AC or 220 volt AC |
| Cycles per minute | 4 | 4 |

Obviously I am not to be limited to the sprocket and chain arrangement depicted in FIG. 3, for as shown in FIGS. 1 and 8, a unitary gearmotor may be effectively utilized, such as a unit manufactured by Sumotomo, Inc., located at 4200 Holland Blvd., Chesapeake, Va. 23323. I prefer to use "SM-Cyclo" gearmotor, Model Type H or V mounting.

I claim:

1. A low pressure, low head pump utilized for supplying periodic surges of liquid to a point of use, said pump comprising a generally vertically disposed cylinder whose lower end resides below the surface of the body of liquid and whose upper end is disposed above the surface of the body of liquid, an opening adjacent the top of said cylinder through which liquid, on occasion, can flow, a lightweight, buoyant piston operatively disposed in said cylinder, power applying means for forcing said piston downwardly, such that it moves from a partially submerged, floating position adjacent the upper end of said cylinder, to a completely submerged position located adjacent the lower end of said cylinder, said piston, when in a lowered position, having thereabove a quantity of liquid residing in said cylinder, and means for suddenly releasing said piston, so it can rapidly rise to the upper end of the cylinder, and in doing so, pushing the quantity of liquid out of said opening in the upper part of the cylinder.

2. The low pressure, low head pump as recited in claim 1 in which said power applying means is operatively attached to the bottom of said piston.

3. The low pressure, low head pump as recited in claim 1 in which said power applying means is operatively attached to the top of said piston.

4. The low pressure, low head pump as recited in claim 1 in which said piston has a series of small passages disposed on the outer sidewall thereof, through which liquid can flow upwardly during the time said piston is being forced downwardly.

5. The low pressure, low head pump as recited in claim 1 in which said piston has a passage disposed in its interior, through which liquid can flow upwardly during the time said piston is being forced downwardly, and flapper valve means for preventing the flow of liquid through said passage at such time as the piston is released from the location adjacent the lower end of said cylinder.

6. The low pressure, low head pump as recited in claim 1 in which said means for suddenly releasing the piston involves the use of a continuously rotating chamfered pulley.

7. A continuously cycling low pressure, low head pump utilized for supplying periodic surges of water across an algal turf closely associated with the surface of a body of water, said pump comprising a generally elongate, vertically disposed cylinder whose lower end resides below the surface of the body of water and whose upper end is disposed above the surface of the body of water and slightly above the algal turf, an opening adjacent the top of said cylinder through which water, on occasion, can flow onto the algal turf, a lightweight, buoyant piston operatively disposed in said cylinder, power applying means operatively attached to said piston, for forcing said piston downwardly from a partially submerged, floating position adjacent the upper end of said cylinder, to a submerged position located adjacent the lower end of said cylinder, said piston having means for permitting a controlled amount of water to pass by said piston during downward movement, said piston, when in a lowered position, having thereabove a quantity of water residing in said cylinder, and continuously operating means for suddenly releasing said piston, so it can rapidly rise to the upper end of the cylinder, and in doing so, pushing the quantity of water out of said opening in the upper part of the cylinder and onto the algal turf.

8. The continuously cycling low pressure, low head pump as recited in claim 7 in which said means for permitting a controlled amount of water to pass by said piston involves a series of small passages disposed on the outer sidewall of said piston, through which passages, water can flow upwardly during the time said piston is being forced downwardly.

9. The continuously cycling, low pressure, low head pump as recited in claim 7 in which said means for permitting a controlled amount of water to pass by said piston involves a passage disposed in the interior of said piston, through which passage water can flow upwardly during the time said piston is being forced downwardly, and flapper valve means for preventing the flow of water through said passage at such time as the piston has been suddenly released from the location adjacent the lower end of said cylinder.

10. The continuously cycling, low pressure, low head pump as recited in claim 7 in which said means for suddenly releasing the piston involves the use of a continuously rotating chamfered pulley.

11. The continuously cycling, low pressure, low head pump as recited in claim 7 in which said mean for suddenly releasing said piston involves the use of continuously rotating chamfered pulley, around which is disposed a rope whose remote end is attached to said piston, said rope being operatively arranged to slip from a certain location on the circumference of said pulley each time said piston is to be released.

12. A continuously cycling, low pressure, low head pump utilized for supplying periodic surges of water across an algal turf closely associated with the surface of a body of water, said pump comprising a generally vertically disposed cylinder whose lower end resides below the surface of the body of water and whose upper end is disposed above the surface of the body of water and slightly above the algal turf, an opening adjacent the top of said cylinder, through which water can flow on occasion, a lightweight, buoyant piston operatively disposed in said cylinder, a rope operatively attached to said piston and thereafter passing around a first pulley, said rope thereafter passing around a second pulley, power applying means operatively associated with said second pulley and arranged to cause said second pulley to rotate in a direction causing said rope to commence wrapping around the periphery of said pulley, such wrapping of the rope around said second pulley forcing said piston to move from a partially submerged, floating position adjacent the upper end of said cylinder, to a submerged position located adjacent the lower end of said cylinder, said piston, when in a lowered position, having thereabove a quantity of water residing in said cylinder, a portion of the periphery of said second pulley being modified such that said rope will slip off the periphery of said second pulley before said second pulley has made a full revolution, which slippage occurs at a time when said piston has been drawn to its lowered position, the rope slipping off of the periphery of said second pulley causing said piston to be suddenly released, so that said piston can rapidly rise to the upper end of the cylinder, and in doing so, pushing the quantity of water out of the opening in the upper part of said cylinder and onto the algal turf.

13. The continuously cycling, low pressure, low head pump as recited in claim 12 in which said second pulley rotates continuously, and in which the relationship of said rope to said second pulley is such that said rope will automatically commence wrapping around the periphery of said second pulley again, immediately after slipping off the periphery thereof.

14. The continuously cycling, low pressure, low head pump as recited in claim 12 in which said rope is operatively attached to the lower end of said piston.

15. The continuously cycling, low pressure, low head pump as recited in claim 12 in which said rope is operatively attached to the upper end of said piston.

16. The continuously cycling, low pressure, low head pump as recited in claim 15 in which a yoke is mounted upon the upper end of said piston, and said rope, after passing over said first pulley, is attached to said yoke.

17. The continuously cycling, low pressure, low head pump as recited in claim 12 in which said piston has a series of small passages disposed on the outer sidewall thereof, through which passages water can flow upwardly during the time said piston is being forced downwardly.

18. The continuously cycling, low pressure, low head pump as recited in claim 12 in which said piston has a passage disposed in its interior, through which water can flow upwardly during the time said piston is being forced downwardly, and flapper valve means for preventing the flow of water through said passage at such time as the piston is released from the location adjacent the lower end of said cylinder.

* * * * *